United States Patent [19]

Ross et al.

[11] 4,146,828
[45] Mar. 27, 1979

[54] PULSE-MODULATED SERVO AMPLIFIER

[75] Inventors: Ronald E. Ross, Newport Beach; W. Paul Wilson, Jr., Fountain Valley, both of Calif.

[73] Assignee: Linear Instruments Corporation, Irvine, Calif.

[21] Appl. No.: 832,095

[22] Filed: Sep. 12, 1977

[51] Int. Cl.$^2$ .............................................. G05B 11/28
[52] U.S. Cl. .................................... 318/599; 318/681
[58] Field of Search .............. 318/599, 341, 678, 681; 330/1 A

[56] References Cited

U.S. PATENT DOCUMENTS

| | | | |
|---|---|---|---|
| 3,260,912 | 7/1966 | Gregory | 318/681 X |
| 3,364,405 | 1/1968 | Henderson | 318/599 X |
| 3,487,458 | 12/1969 | Martens et al. | 318/599 |
| 3,582,750 | 6/1971 | Halfhill | 318/681 X |
| 3,847,407 | 4/1975 | Griswold | 318/599 X |
| 4,072,883 | 2/1978 | Beiter | 318/599 X |

Primary Examiner—B. Dobeck
Attorney, Agent, or Firm—Lawrence Fleming

[57] ABSTRACT

A servo amplifier for d-c servo motors which converts the error signal into pulses which are amplified in a saturating amplifier to drive the motor. Both the duty cycle and the repetition rate of the pulses vary with the error signal. At large error signals the duty cycle is 100 percent, i.e., "full on"; at small error signals the duty cycle is low and the pulses spaced far apart. As the system approaches balance the pulses become shorter and less frequent, and the motor slows. The circuit comprises a signal integrator which drives two comparators, one for positive signals and the other for negative. The integrator generates a ramp voltage in a direction opposite to the polarity of its input, and is reset automatically by reset pulses of controlled and variable length when a comparator set point is reached. The reset pulses are the pulses which are amplified to drive the servo motor. In this system, reducing the gain does not produce a widened dead band, but only increases the time required for rebalance. The dead band is considerably more tightly controlled than in prior systems. A novel overload shutdown circuit cuts off the input to the power amplifiers when a large, off-scale input signal occurs for longer than a predetermined time.

9 Claims, 3 Drawing Figures

PULSE-MODULATED SERVO AMPLIFIER

BACKGROUND

Servo amplifiers are used to drive servo motors in positioning devices of many kinds, from indicating and recording instruments to large steerable antennas and gun mounts. D-c servo motors are now the more widely-used type. Among the numerous general kinds of amplifiers, a common type is a straight d-c amplifier with suitable phase-lead circuits to provide system damping, and output stages with the power capability to drive the motor in either direction.

These and most other prior amplifiers provide a dead band around the null point, where the output is not enough to overcome the mechanical friction in the system; the dead band gets wider as the gain is reduced. In larger systems, the relatively low efficiency of a class-B ouput stage tends to make the heat dissipation and cost undesirably high.

A few prior servo amplifiers have employed pulse modulation means to improve the efficiency, operating the output stages as saturated switches, and to reduce the dead band. For example, Martens et al, U.S. Pat. No. 3,487,458, shows such an amplifier in which the repetition rate of fixed-width pulses is varied proportionally to the magnitude of the error signal. Prior such amplifiers generally vary only one parameter of the pulses, and in linear relation to the input or error signal. They are also relatively complicated, and lack positive circuitry to cut back the motor drive during prolonged extreme overloads, as from a stalled motor or an off-scale input signal.

There is a need for an efficient pulse-type servo amplifier capable of non-linear modulation of both pulse width and repetition rate to provide a minimal dead band, and of simple construction.

BRIEF SUMMARY

The servo amplifier of this invention comprises the following sub-circuits: (1) pre-amplifier and rebalance circuitry; (2) ramp generator; (3) a pair of comparators, one for each polarity of ramp voltage; (4) a pair of reset circuits; (5) a pair of overload shutoff circuits; and (6) a pair of switching-mode output amplifiers to drive the servo motor. The above sub-circuits or "blocks" are cascaded, each receiving a signal at its input, processing it, and feeding the processed signal to the next. Each paired circuit consists of one for each polarity of error signal. Only one of a pair works at a time.

The amplified error signal is fed to the ramp generator, which may be a suitable feedback-type integrator; it generates a ramp voltage which increases in a direction opposite to the polarity of its input. When the ramp voltage reaches the set point of a comparator, that comparator causes a reset circuit (which may comprise a single transistor) to reset the ramp generator. The reset pulses are of finite and controlled duration. These reset pulses are fed to the output amplifiers to drive the motor.

The overload shutoff circuits are shunted across the input lines to the power output amplifiers. They include R-C time delays. When either such input remains substantially "continuously on" for a predetermined time, such as about 0.6 second, the corresponding shutoff transistor saturates and shorts out that input, removing the drive power to the motor. When the signal overload is removed, the circuit automatically resets itself.

At small error signals, an output amplifier delivers short-duration driving pulses widely spaced apart. At somewhat higher signal levels, the repetition rate increases and the duty cycle becomes greater, e.g., 50 percent. At still higher error signal levels, the repetition rate decreases while the duty cycle increases further; at maximum, it is 100 percent, a power output stage being saturated and delivering continuous d-c power to the servo motor.

A suitable embodiment of a complete amplifier employs four integrated-circuit operational amplifiers and eight discrete transistors.

DETAILED DESCRIPTION

Figure 1:
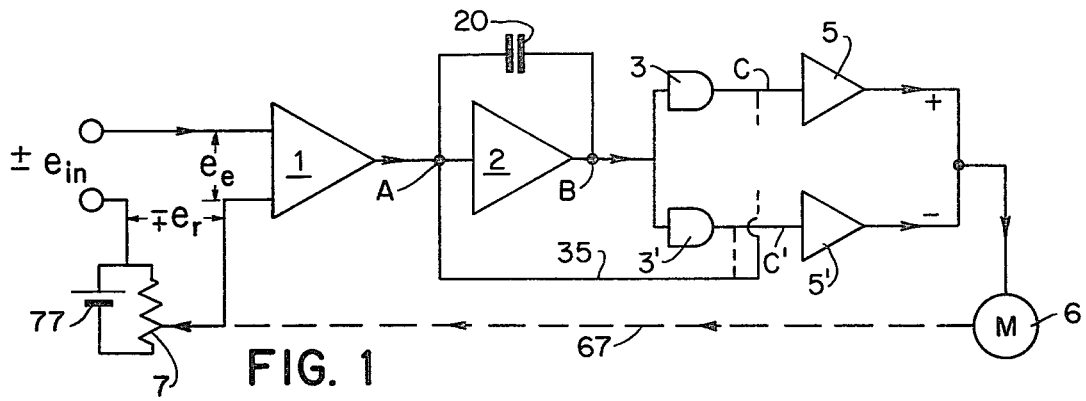
FIG. 1 is a simplified block diagram of an amplifier.

FIG. 1 shows the principle of the invention in simplified form as applied to a d-c servo system of the slide-wire type, as used for example in potentiometric chart recorders. An external input signal $e_{in}$ is applied to the input terminals of a preamplifier 1. Connected in known manner to buck or balance the input voltage $e_{in}$, is the reference or balancing voltage $e_r$ from "slide-wire" potentiometer 7 which is connected across a suitable source of reference voltage 77. Potentiometer 7 is driven mechanically by the servo motor 6 through a suitable mechanism indicated by dotted line 67. The net input signal $e_e$ to preamplifier 1 is the error signal and is, of course, the difference between $e_{in}$ and $e_r$. The two power amplifiers 5, 5' drive d-c motor 6 in a direction to reduce error signal $e_e$ toward zero, one or the other power output stage 5 or 5' conducting according to the direction of rotation required.

It will be understood that this invention is not restricted to straight d-c potentiometric systems of the kind just described. It may be applied to carrier systems having variable capacitance or inductance elements, with suitable modulating and demodulating circuitry of designs known to the art. Element 7, FIGS. 1 and 2, may be any device that can vary the magnitude of an electrical signal, and element 6 may be any type of transducer that will translate an electrical quantity into another form of power.

Figure 2:
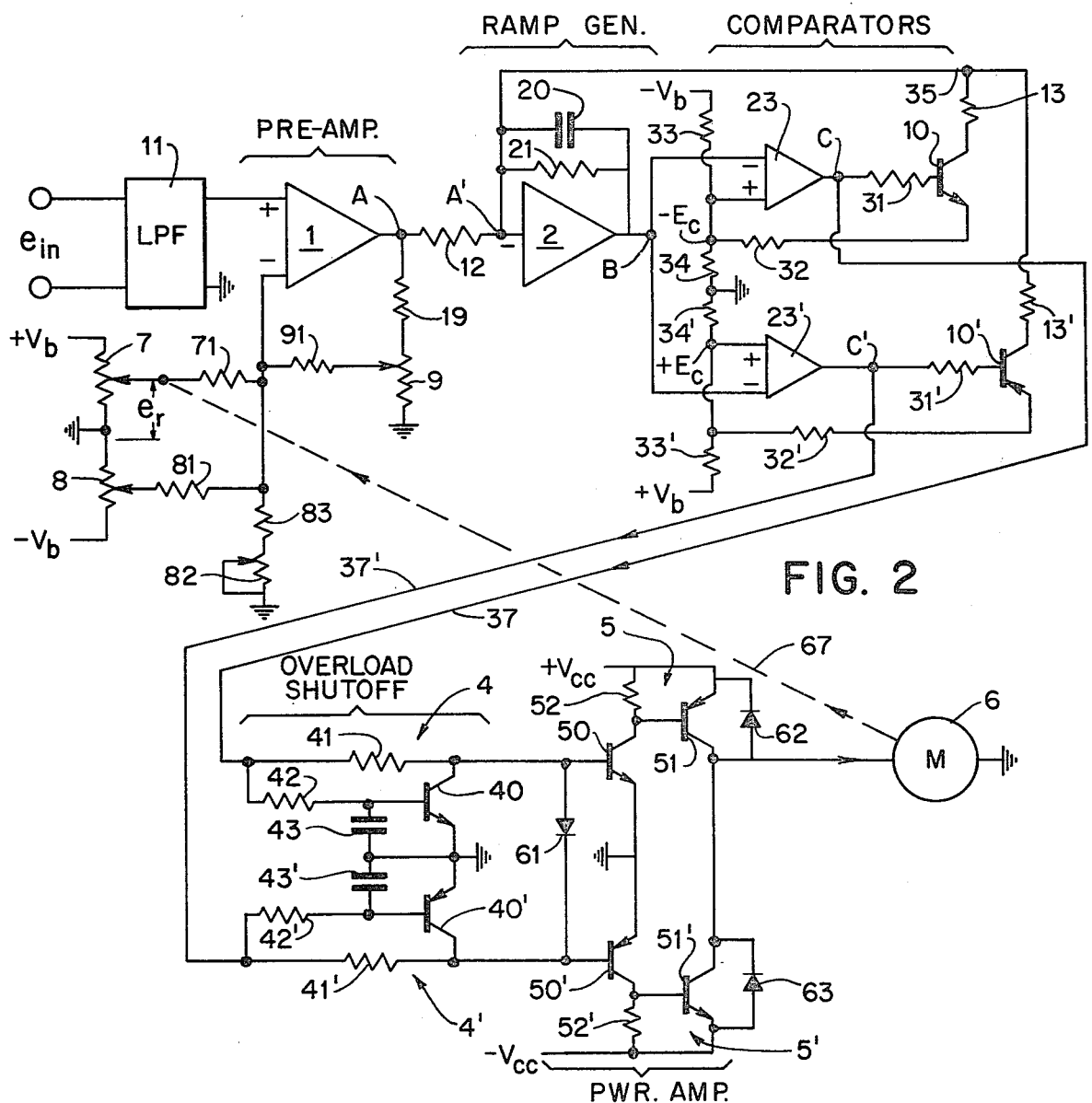
FIG. 2 is a complete circuit diagram showing all the essential components, some in block form.

Continuing with FIG. 1, the output of preamplifier 1 is fed to a ramp generator which preferably takes the common form of an operational amplifier 2 with an integrating feedback capacitor 20. At its output, point B, the voltage increases linearly in a direction opposite to the polarity of the amplified error voltage appearing at its input, point A. The ramp voltage at point B is fed to a pair of comparator circuits 3 and 3' which are biased to set-points $+E_c$ and $-E_c$, respectively (FIG. 2). When the ramp voltage at point B reaches a comparator set-point, that comparator "toggles", delivering a step-function output at point C or C'. Reset circuits, not shown in FIG. 1, then shift the comparator setpoints, creating hysteresis or "toggle" action in known manner, and apply current back to the integrator input, point A, resetting the integrator via a reset bus 35. The reset interval is of some appreciable length in relation to the usual duration of the ramp.

During the reset interval, the comparator remains "toggled", delivering a saturated output voltage at point C or C'. At the end of the reset interval, the comparator goes back to its quiescent state. The "toggled" comparator output during the reset interval constitutes a pulse.

These pulses are amplified by the appropriate one of the pair of power amplifiers 5 or 5', depending on their polarity, and the amplifier drives servo motor 6 in a direction toward null. Negative-going ramp voltages at point B actuate comparator 3 and output stage 5; positive-going ramps actuate comparator 3' and output stage 5'.

Since the slope of the ramp function varies with the amplitude of the error signal at point A, the reset pulses will occur more frequently when the error signal is larger.

Referring now to FIG. 2, a complete embodiment may include a suitable known type of low-pass filter 11 between the signal input terminals, labeled $e_{in}$, and d-c preamplifier 1, which may be an operational amplifier of any suitable type with its gain adjustable by means of a conventional resistive feedback network 9, 19. The rebalance ("slide-wire") potentiometer 7 (or other suitable transducing element) is connected in known manner, deriving a bucking or rebalancing voltage $e_r$ from a suitable bias voltage $+V_b$ from a suitable source not shown. A zero-set potentiometer 8 with a suitable fixed series resistor 81, and a span-setting potentiometer 82 with a suitable range-determining fixed resistor 83, are shown connected in a manner known in the art of potentiometric recording instruments. One side of the zero-set potentiometer 8 is returned to a second, negative, bias voltage $-V_b$, its source being a supply of any suitable type, not shown.

The preamplifier output signal at point A is fed through a suitable resistor 12 to the input of the ramp generator, which may be of the well-known type using an operational amplifier 2 with integrating feedback capacitor 20.

In this invention, the integrating capacitor 20 is shunted by a high-value resistor 21. The purpose of resistor 21 is to provide a small, but finite, dead band of, e.g., 0.01 to 0.05 percent of full scale, by reducing the d-c gain of operational amplifier 2 to a predetermined value. This permits the servo motor 6 to remain stopped when it reaches balance. Without resistor 21, inconsequentially-small error signals would generate very slow ramp voltages at point B which would randomly pulse the motor 6 at long intervals, causing it to "hunt" continuously and slowly at insignificantly small amplitudes. That is, the d-c negative feedback provided by shunt resistor 21 sets the minimum error signal that will integrate and generate a pulse to the motor 6. This minimum error signal is typically very small, such as one-fourth the width of the pen trace on a chart recorder.

The ramp generator 2, 20, 21 is connected to suitable positive and negative power supplies, not shown, so that its output voltage may proceed in either direction (of polarity) with respect to ground.

A positive output signal from the preamplifier 1, at point A, FIG. 2, will produce a negative-going ramp voltage at point B. Applied to the "−" or inverting input of comparator 23, this ramp will cause that comparator's output at point C to "toggle" from negative saturation to positive saturation when the comparator set-point is reached. It will not affect the other comparator 23'. Each comparator may comprise an operational amplifier of known type with a differential input. The set-point $-E_c$ of comparator 23 is determined by bias resistors 33, 34, and may conveniently be about −2 volts.

Reversely, a negative preamplified signal at point A will produce a positive-going ramp at B, and cause the other comparator, 23', to "toggle" instead, producing a negative saturated output step (to approximately the negative supply voltage $-V_{cc}$) at point C'. The comparator's set-point $+E_c$ is derived from bias resistors 33', 34' which divide the voltage from the positive bias supply, not shown, at $+V_b$. $E_c$ may conveniently be about +2 volts. The two bias supplies ($\pm V_b$) may deliver 5 volts each.

The comparator outputs at points C or C' are fed to reset transistors 10, 10' via suitable series base resistors 31, 31', and to the motor-driving amplifier transistors 50, 51 and 50', 51' via leads 37 and 37'. A pair of overload shutoff circuits 40-43 and 40'-43' are provided between the power amplifier inputs and ground. These will be described later.

To pursue in detail the operation of the system on a positive-going ramp, the output of comparator 23' at point C' is normally saturated in the positive direction, at approximately the supply voltage $+V_{cc}$. In this standby state, it holds transistors 10', 40', 50' and 51' in the "off" state. When the ramp voltage at point B reaches the value of the comparator set-point voltage $+E_c$, the comparator 23' toggles to a saturated negative output at point C'. Transistors 10', 50' and 51' all turn on. Reset transistor 10', through its emitter resistor 32', now pulls the set-point $+E_c$ toward ground, reinforcing in known manner the "toggle" action of the comparator; at the same time, the collector current of transistor 10', fed to the ramp generator summing junction at A' via reset bus 35, reverses the direction of the ramp. That is, the collector current from the reset transistor overrides the signal current coming in through resistor 12 at point A', the summing junction input of the integrator, and drives the integrator in the opposite direction. The ramp now proceeds back toward zero (ground potential). The time required for this reversed ramp voltage to reach the point at which 23' toggles back to, plus saturation, is the reset interval. When the reset interval is over, point B is at the same voltage that $+E_c$ was at during the reset interval, and the comparator 23' toggles back to plus saturation at C', turning off the transistors 10', 50', 51' and so cutting off the drive to the motor. This is the manner in which the motor is driven by the amplified reset pulses.

Since the current in reset bus 35 has now disappeared, the signal voltage at point A' now takes over, and the ramp voltage at point B again increases in the positive direction, repeating the cycle of operation until motor 6 drives rebalance element 7 to null.

The reset current in bus 35 is determined by the base, emitter, and collector resistors of transistors 10 and 10', as well as by the transistor type. The duration of the reset interval is determined by the difference between the reset current and the error-signal current coming through resistor 12 at the summing junction, point A'. If the error signal is small, the difference will be large and the reset interval short. If the error signal is large, the difference will be small and the reset interval correspondingly longer. Thus, the motor drive consists of relatively short pulses, widely spaced, when the error signal is small: the wide spacing being due to the relatively long duration of the integrator ramp. And when the error signal is larger, the reset pulses that act to drive the motor become longer and occur more frequently.

A portion of the functioning of the whole circuit is in the manner of a voltage-to-frequency converter; however, the pulse width is also modulated.

For negative-going ramp voltages at point B, the operation of the circuit is the same except for polarity. See Table I below. When the output of the preamplifier at point A is positive, the ramp at point B runs negative. Comparator 23', transistors 10', 40', 50' and 51' remain turned off (quiescent). Comparator 23 toggles, its output at point C in a step-function from approximately $-V_{cc}$ to $+V_{cc}$, and turns on transistors 10, 50, and 51. The motor 6 is then driven in a direction opposite to that in the previous example.

The pulse width is primarily adjusted by the values of integrating capacitor 20 and of the emitter and collector resistors 13, 32, 13', 32' of reset transistors 10, 10'. The time between pulses, for a given error signal, is adjustable by means of gain potentiometer 9.

The following Table I summarizes the signal polarities at key points in the circuit of FIG. 2:

TABLE I

| signal at A | signal at B (ramp) | resulting comparator outputs at C | at C' | output amplifiers 5 | 5' | drive to motor 6 |
|---|---|---|---|---|---|---|
| + | neg.-going | $+V_{cc}$ (toggled) | (quiescent at $+V_{cc}$) | ON | OFF | Positive |
| − | pos.-going | (quiescent at $-V_{cc}$) | $-V_{cc}$ (toggled) | OFF | ON | Negative |

Figure 3:
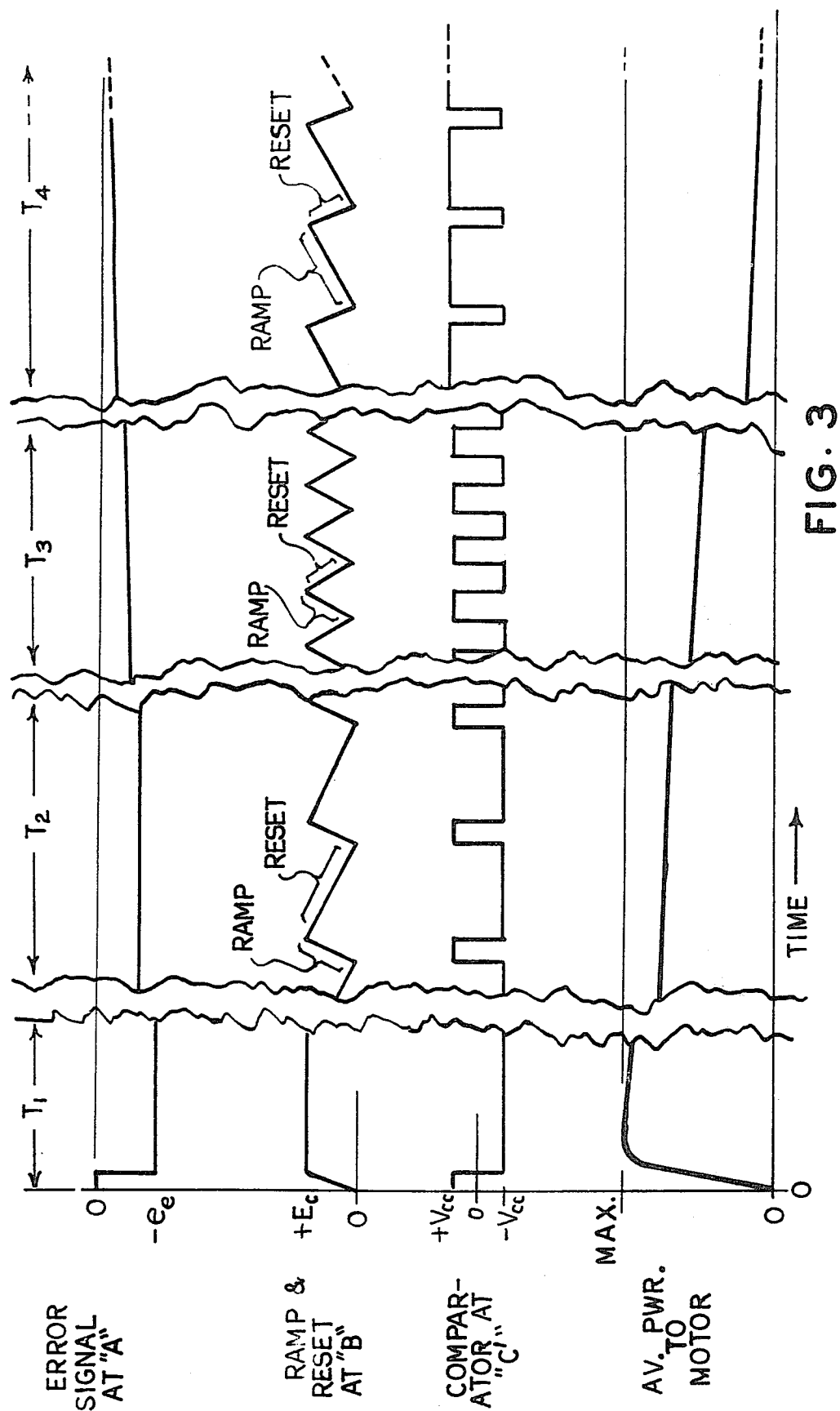
FIG. 3 is a diagram showing waveforms at key points and time intervals in the system.

FIG. 3 is a set of voltage vs. time graphs illustrating the operation of the circuit of FIG. 2 in response to a large, but not off-scale, input signal $e_{in}$ applied as a step function. The polarity of $e_{in}$ is assumed such as to produce a negative error signal at the preamplifier output, point A, as shown at the top of FIG. 3. It is also assumed that the error signal is initially so large that the collector current of the reset transistor 10' is insufficient to override the signal current at the summing junction point A', so that reset transistor 10' remains continuously on, trying unsuccessfully to reverse the direction of the integrator ramp at point B. Time period $T_1$, FIG. 3, illustrates this condition.

Going from the top down in FIG. 3, the graphs illustrate the error signal voltage at point A, the ramp and reset voltages at point B (FIG. 2), the output of comparator 23' at point C', and qualitatively the average power to the motor 6. During time period $T_1$, the voltage at point B remains positive while the comparator output at C' remains saturated negative. The negative amplifier output stage 50', 51' is saturated "on", and the motor runs at maximum speed.

During the next interval $T_2$, the error signal is assumed to have decreased enough (since the motor 6 is driving the system toward balance) to permit the reset current on bus 35 to just override the error signal at summing junction A'. Hence, the positive-going ramp is short due to the large error signal current, and the reset interval and the motor drive pulses are long, because the net reset current available at A' is relatively low.

The following time interval $T_3$, FIG. 3, illustrates a condition of about 50 percent duty cycle which occurs when the error signal has decreased to a relatively medium level. The final period, $T_4$, illustrates conditions near balance, when the error signal has become small. Here the ramp period is long and the reset interval short, so that the motor 6 is driven by short-duration pulses of low duty cycle, and moves relatively slowly toward balance. It will be noted that the pulse repetition rate is highest during period $T_3$ and lower during $T_2$ and $T_4$; but that the percentage of motor "on" time is highest during intervals $T_1$ and $T_2$, being 100 percent during period $T_1$.

In a typical recorder of the invention, the whole rebalancing operation, coming to within about 0.05 percent of exact null, may take about 0.2 second.

Two features of the motor drive circuitry of FIG. 2 will now be described. First, the overload protective or shutoff circuits, indicated generally at 4 and 4', comprise resistors 42, 42', capacitors 43, 43', and shunt shutoff transistors 40, 40'. The shutoff circuits 4 and 4' are the same, except for polarity; only one operates at a time.

Assume that the pulses, such as those in FIG. 3 at point C', are positive-going. If the motor 6 is stalled as by an input overload (off-scale) condition existing for more than a predetermined time such as 0.6 second, capacitor 43, through resistor 42, charges up to a level of about 0.6 volts. This drives the overload shutoff transistor 40 into saturation, which substantially shorts the base of output driver transistor 50 to ground, preventing power from reaching the motor 6.

If the overload is of the opposite polarity, shutoff circuit 4 is unaffected, but circuit 4' operates in the same manner, shorting out the signal drive to the base of transistor 50'.

Series resistors 41, 41' are high enough to permit such shorting out, but not high enough to appreciably attenuate the signals to the bases of transistors 50 or 50'.

It will be evident that in normal operation, the signals on lines 37, 37', FIG. 2, will alternate in polarity as the error signal moves back and forth within the limits of the system; hence, the only time that a net charge can build up on capacitor 43 or 43' to effect shutoff is when the system is unable to rebalance itself, as when the signal input is off-scale or for some other reason the motor is stalled. The overload shutdown circuits 4, 4' will automatically reset as the charge on a capacitor 43 or 43' leaks off, as the error voltage again becomes small when the system is restored to a normal condition.

A second feature of the motor drive amplifier circuitry shown in the lower portion of FIG. 2 is the interlock diode 61 connected between the bases of driver transistors 50 and 50'. Should some circumstance, such as an extraneous noise pulse or turn-on pulse, cause both output transistors 51 and 51' to conduct simultaneously, they would be damaged, since excessive current would flow directly through both transistors from the positive to the negative power supply. The interlock diode 61 permits only one of the two drivers 50 or 50' to conduct at a time. When the base of driver transistor 50 is driven positive, diode 61 conducts and pulls the base of the other driver 50' positive, insuring that it is cut off. Conversely, when the base of driver 50' is driven negative to turn it on, interlock diode again conducts, maintaining the base of driver 50 negative and keeping it cut off.

Protective diodes 62 and 63 are also provided in known manner between the emitter and collector of each output transistor 51, 51', as shown in FIG. 2.

The preferred embodiment of the invention known to applicants at the time of this application employs the circuit of FIG. 2 with the constants given in Table II below:

TABLE II

| | | |
|---|---|---|
| Amplifiers: | 1, 2, 3, 3' | Integrated quad operational amplifier, type CA 324, LM 324, or equiv. |
| Resistors: | 12 | 10K |
| | 13, 13' | 100 ohms |
| | 33, 33' | 10K |
| | 34, 34' | 15K |
| | 32, 32' | 2K |
| | 31, 31' | 100K |
| | 41, 41' | 22K |
| | 42, 42' | 220K |
| | 52, 52' | 33K |
| | 21 | 1 megohm |
| Capacitors: | 20 | 0.22 mfd |
| | 43, 43' | 10 mfd |
| Transistors and diodes: | 10, 40, 50 | Type 2N3565 |
| | 10', 40', 50' | Type 2N4249 |
| | 51 | Type 2N6107 |
| | 51' | Type 2N5298 |
| | 61, 62, 63 | Type 1N914 |
| Supply Voltages: | $V_{cc}$ | ±12V |
| | $V_b$ | ±5V |

The low-pass filter 11, FIG. 2, and the circuit elements 7, 8, 9, 82, 71, 83, 91 associated with the input, preamplifier, and rebalance circuitry may all be of known kinds and connections common in the art of potentiometric recording instruments and do not form a part of the invention. Phase-lead circuits of known type, not shown, are incorporated for damping.

The principal advantage of the system of the invention is a very tight dead band. This is implemented by the circuit's ability to integrate very small error signals and then generate pulses with sufficient power to the motor to incrementally approach the null point of the rebalance element 7 or the like. Such very small error signals are normally lost in the dead band of prior conventional systems. As described above, the shunt resistor 21 is adjusted or chosen to provide sufficient d-c feedback around integrating amplifier 2 so that the system will not hunt about the null point. The small amount of dead band thus created is, however, typically at least an order of magnitude smaller than that of prior conventional systems.

A simple test made with the fingers will show qualitatively the behavior of a servo-type chart recorder made according to the invention. The pen may first be positioned at a convenient point on the scale by means of zero-set potentiometer 8, FIG. 2. The pulley on the d-c servomotor shaft is then grasped with the fingers and an increasing torque applied. The restoring torque pulses, applied by the motor 6 in opposition to the fingers, are easily felt. At no applied torque the motor is passive; at low torque the pulses occur at a slow rate, such as a few per second; at higher applied torque they occur more rapidly, up to a repetition rate of typically 200 or 300 per second. At still higher torque the pulses disappear, the motor exerting a steady maximum torque in the "full on" mode, as indicated in the left-hand portion of FIG. 3. At a still further increase in applied torque, maintained for a second or more, the overload shutoff circuit 4 or 4', FIG. 2, cuts off the power to the motor, which now may be turned freely. The power remains cut off until the input signal or zero control is reset to agree with the position of the pen, when the system automatically restores itself to normal operation.

A further illustrative test may be made by repeatedly applying and removing a constant signal voltage to the input terminals at $e_{in}$, FIG. 2, while changing the servo loop gain by means of potentiometer 9. At maximum gain, the pen returns quickly to its previous position. At a gain of, say 1/10 this value, the pen returns more slowly. But at both gain settings, the pen's final position is the same within the usual tolerance, which is about half the width of a pen line or 0.02 percent on a chart 10 cm. wide. Reducing the system loop gain does not appreciably widen the dead band in the present device, but only increases the time required for rebalance. Nor does a small change in loop gain have an appreciable effect on the damping.

In the appended claims, the term "cascade" means the connection of signal output terminals of a sub-circuit or circuit element to signal input terminals of another element or sub-circuit. The term "servo amplifier" is used to mean all the circuitry between the input terminals for the externally-applied signal and the output motor or other such transducing device.

The amplifier of the invention is particularly useful in portable battery-powered chart recording instruments, where its high efficiency reduces the weight and cost of the batteries required. In this application, the servo motor is a very small d-c motor of a commonly available type.

We claim:

1. A servo amplifier comprising:
an input circuit;
an integrator having an integrator input terminal cascaded thereafter and connected to deliver positive-going and negative-going output ramp voltages at an integrator output terminal;
a positive-going signal comparator and a negative-going signal comparator, both cascaded after said integrator with their inputs in parallel, and each having comparator output terminals;
a positive and a negative reset circuit, each cascaded after one of said comparators respectively;
a reset bus connected to said integrator input terminal and connected to both of said reset circuits to deliver reset current of either polarity thereto; and
pulse signal paths from each said comparator output terminal respectively to power amplifier input terminals of a positive and a negative signal power amplifier to produce motor-driving pulses,
both said power amplifiers having a common output terminal; and
servo motor means drivably connected to said common output terminal,
said reset current reversing said ramp voltage and driving it from a predetermined set-point level back toward zero during a reset interval, and
said motor-driving pulses substantially occupying each said reset interval.

2. A servo amplifier as in claim 1, wherein:
each said reset circuit comprises a transistor having an input terminal with a signal path to a said comparator output terminal, a collector connected through a signal path to said reset bus, and an emitter connected through a bias signal path to a bias input terminal of a said comparator.

3. A servo amplifier as in claim 2, wherein:
each said bias signal path comprises an emitter resistor, and
each said bias input terminal is connected to a voltage divider which maintains a set-point bias thereat,
each said comparator output toggling between a positive and a negative saturation voltage with respect to ground when a said ramp voltage exceeds a said set-point.

4. A servo amplifier as in claim 3, wherein:

each said power amplifier is of the saturated switching type.

5. A servo amplifier as in claim 4, wherein:

each said power amplifier comprises a driver stage and an output stage in cascade, the collectors of said output stages being connected substantially together to provide said common output terminal.

6. A servo amplifier as in claim 1, further comprising:

overload shutdown means in said pulse signal paths to said power amplifiers and comprising integrating and shutdown switching means responsive to overload signals in said paths of greater than predetermined duration.

7. A servo amplifier as in claim 6, wherein:

said switching means comprises a saturable shutoff transistor with its collector-emitter circuit shunted from each said path to ground, and said integrating means comprises an R-C integrating network fed from each said path and delivering an integrated shutoff signal to the input of each said shutoff transistor, a said shutoff transistor, when saturated, shorting out a said signal path.

8. A servo amplifier as in claim 1, wherein:

said integrator comprises an operational amplifier with input and output terminals and an integrating capacitor connected therebetween, and a resistor connected across said integrating capacitor to restrict the d-c gain of said amplifier to a predetermined value to prevent slow hunting.

9. A servo amplifier as in claim 1, further comprising:

an interlock diode connected between said power amplifier input terminals to prevent simultaneous conduction of said positive and negative signal power amplifiers.

* * * * *